(12) United States Patent
Tanoue

(10) Patent No.: US 7,308,262 B2
(45) Date of Patent: Dec. 11, 2007

(54) CONTROLLER AND CONTROL METHOD FOR MOBILE COMMUNICATION SYSTEM

(75) Inventor: Katsumi Tanoue, Tokyo (JP)

(73) Assignee: NEC Corporation, Tokyo (JP)

( * ) Notice: Subject to any disclaimer, the term of this patent is extended or adjusted under 35 U.S.C. 154(b) by 630 days.

(21) Appl. No.: 10/804,075

(22) Filed: Mar. 19, 2004

(65) Prior Publication Data

US 2004/0185905 A1     Sep. 23, 2004

(30) Foreign Application Priority Data

Mar. 19, 2003   (JP)   ............... 2003-074694

(51) Int. Cl.
*H04Q 7/20* (2006.01)
(52) U.S. Cl. ............ 455/436; 455/67.11; 455/226.2; 455/522; 370/332
(58) Field of Classification Search ........ 370/331, 370/328, 332; 455/436, 522, 67.13, 67.11, 455/226.2
See application file for complete search history.

(56) References Cited

U.S. PATENT DOCUMENTS

2004/0203980 A1* 10/2004 Das et al. ............... 455/522
2006/0013165 A1*  1/2006 Choi et al. .............. 370/331

FOREIGN PATENT DOCUMENTS

| JP | 2001-217770 | 8/2001 |
| KR | 2002-4452 | 1/2002 |

OTHER PUBLICATIONS

Korean Office action dated Jun. 28, 2006 citing the above-listed document.
3GPP2 S.R0023, Version 2.0, version date: Dec. 5, 2000, High-speed Data Enchancements for cdma2000 1x-Data only.
3GPP TS 25.214 v5.3.0 (2002-12) Technical Specification, $3^{rd}$ Generation Partnership Project; Technical Specification Group Radio Access Network; Physical layer procedures (FDD) (Release 5).
3GPP TS 25.308 v5.3.0 (2002-12) Technical Specification $3^{rd}$ Generation Partnership Project; Technical Specification Group Radio Access Network; High Speed Downlink Packet Access (HSDPA); Overall description; Stage 2 (Release 5).

* cited by examiner

*Primary Examiner*—Temica Beamer
(74) *Attorney, Agent, or Firm*—Young & Thompson

(57) ABSTRACT

A controller in a wireless communication system for a mobile station simultaneously communicating with a plurality of base stations comprises a receiver receiving a plurality of signals, relating to a fist communication type, from a plurality of base stations, and receiving a signal, relating to a second communication type different from the first communication type, from a specific base station; and a transmitter, coupled to the receiver, transmitting a control signal generated on the basis of the signal relating to the second communication type received by the receiver from the specific base station, to the plurality of base stations and the specific base station.

20 Claims, 8 Drawing Sheets

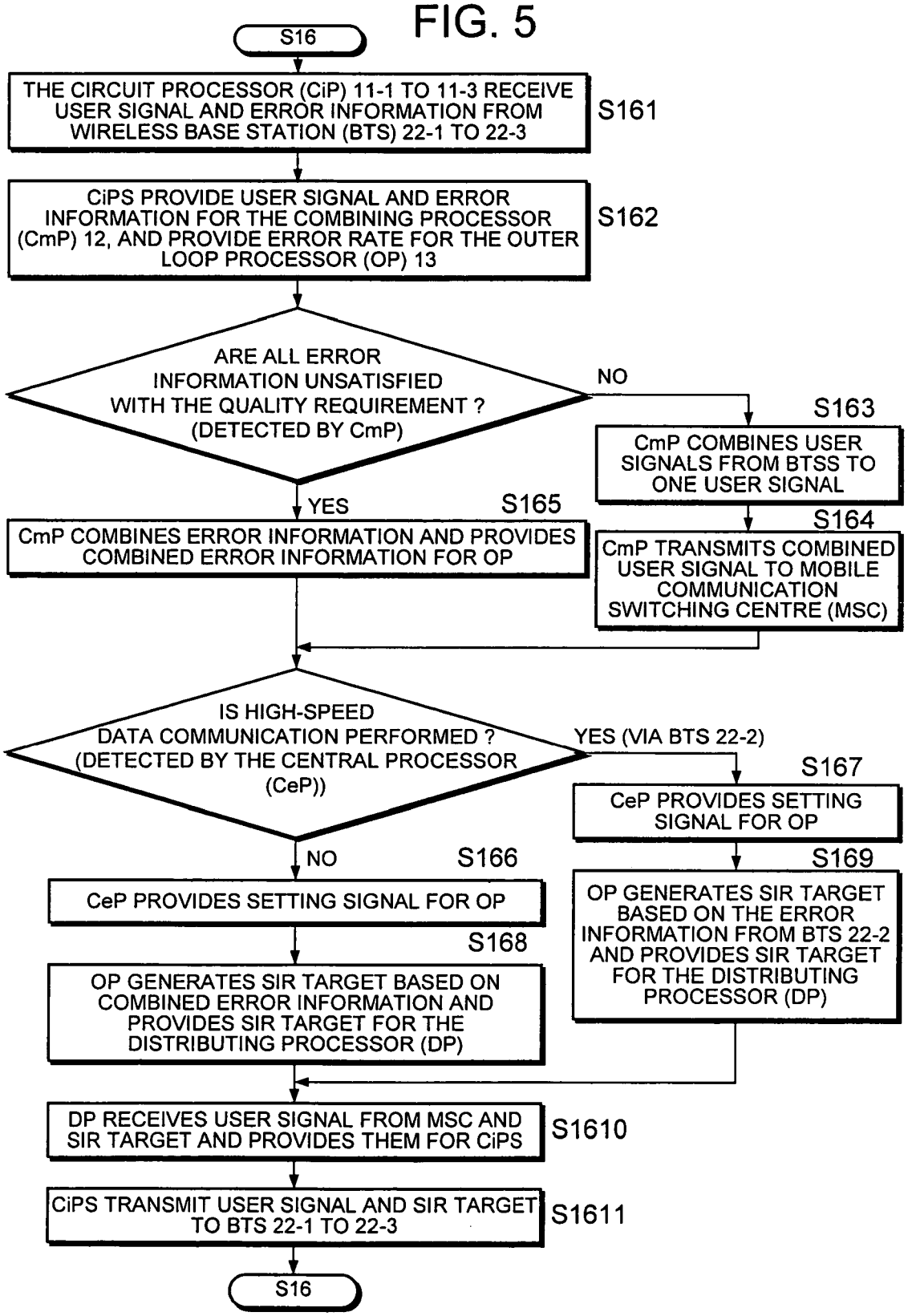

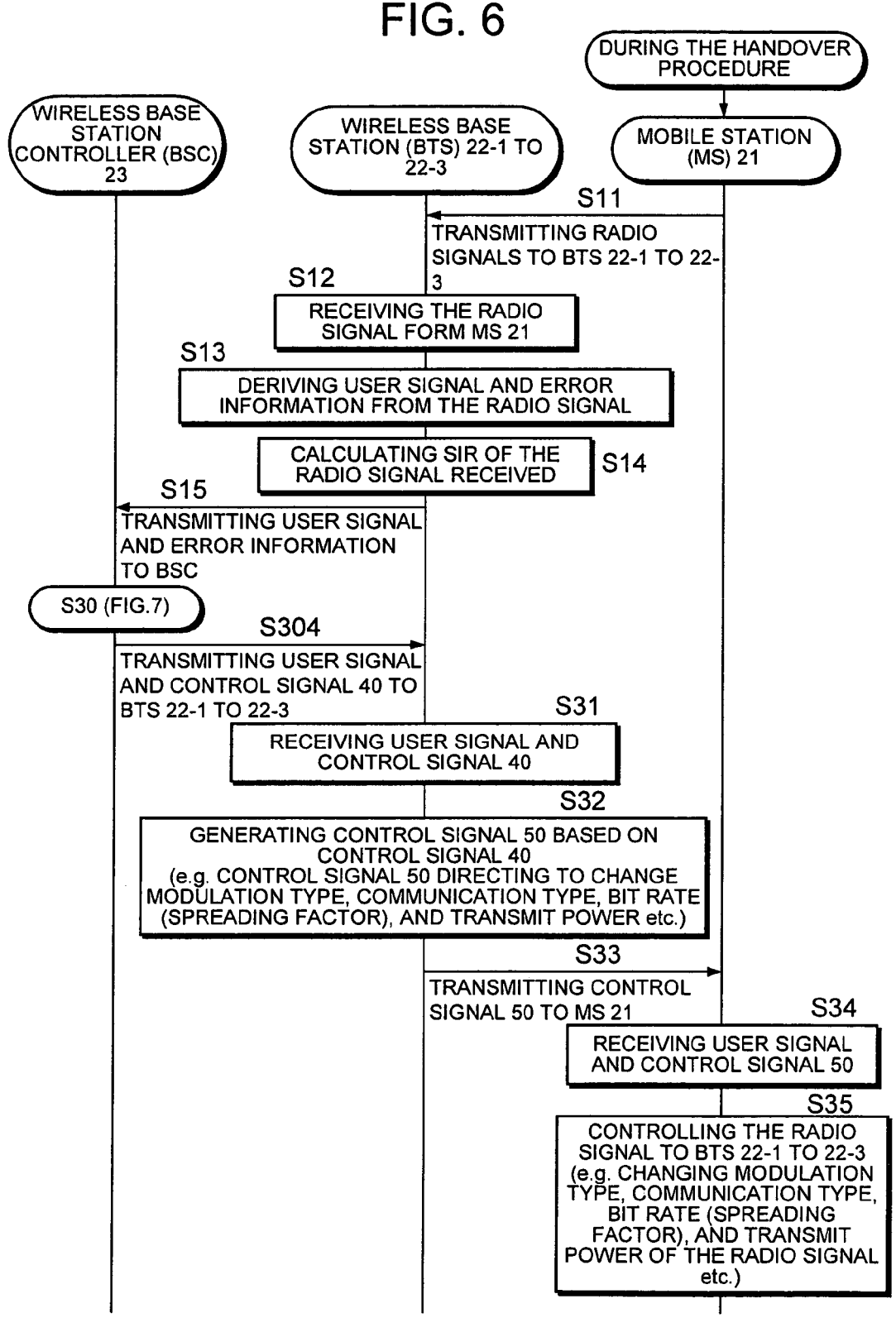

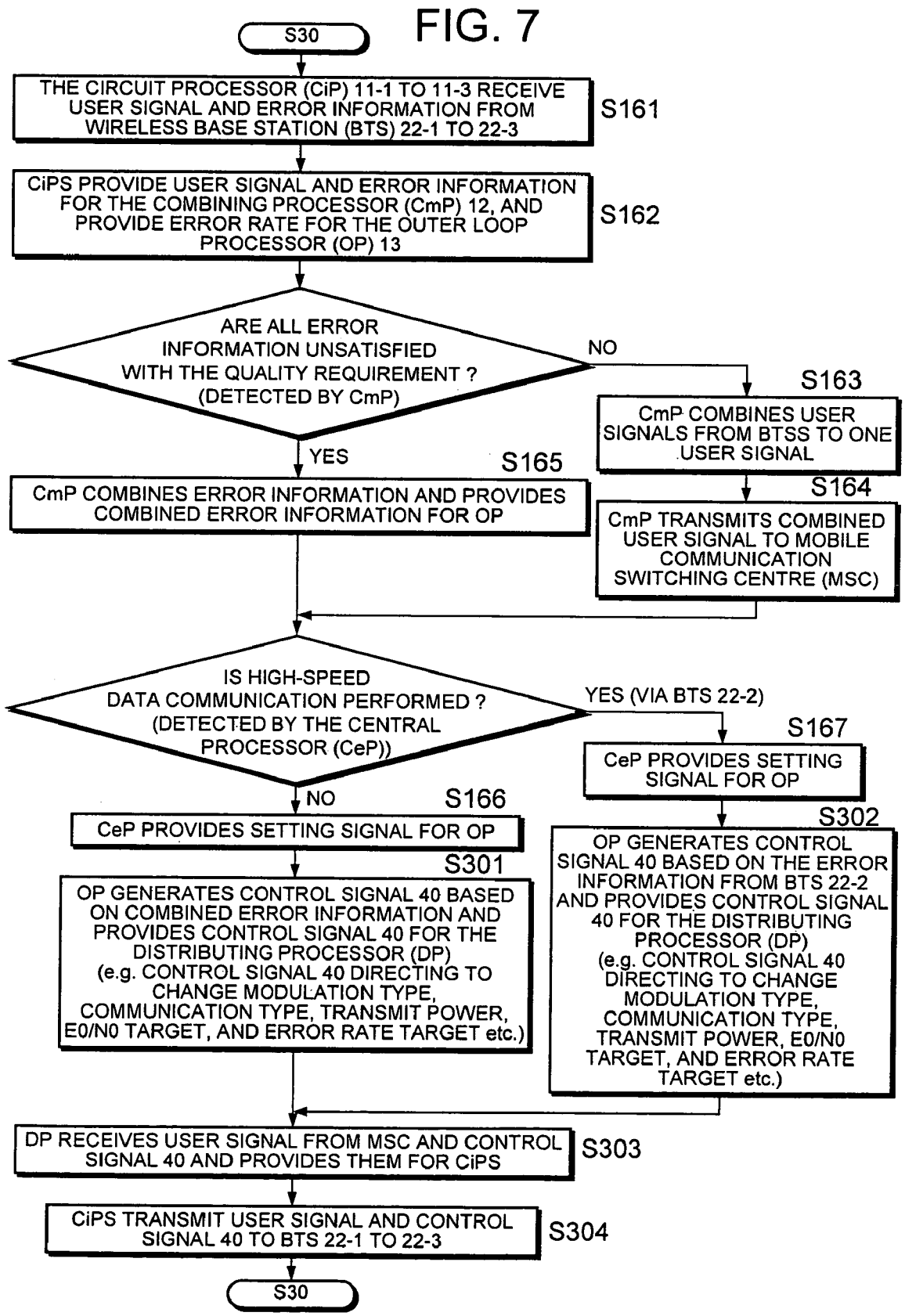

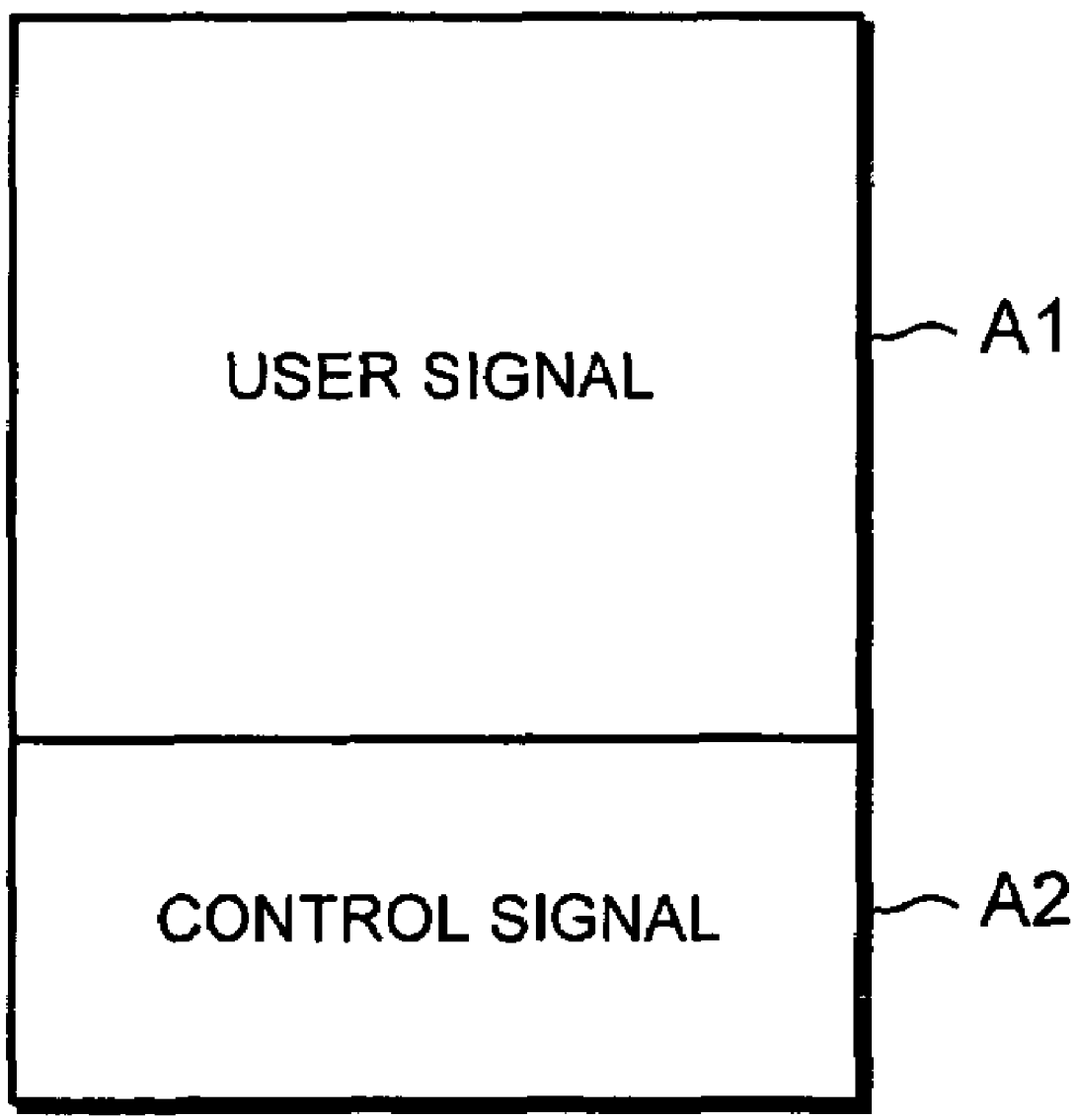

CONTROLLER AND CONTROL METHOD FOR MOBILE COMMUNICATION SYSTEM

BACKGROUND OF THE INVENTION

The present invention relates to a mobile communications system and a controller, and to a control method used therein.

In a cellular mobile communications system, a mobile station for performing a communication including voice communication performs handover when moving between wireless zones (cells) corresponding to wireless base stations. During the handover procedure, the mobile station transmits radio signals to the plurality of wireless base stations involved in the handover. The wireless base stations involved in the handover transmit a user signal included in the radio signal received from the mobile station to a wireless base station controller, and the wireless base station controller combines the received user signal and transmits it to a core network via a mobile communication switching center.

The wireless base station controller receives the signal from the core network via the mobile communication switching center, and transmits the received signal to the plurality of wireless base stations involved in the handover. The wireless base stations involved in the handover transmit the signal received from the wireless base station controller to the mobile station, which combines the signal received from the wireless base stations involved in the handover.

Meanwhile, in cellular mobile communication systems, the adoption of a high-speed data communication methods specializing in data communication has been under research and development. For example, HSDPA (High Speed Downlink Packet Access) technologies on the W-CDMA (Wide band Code Division Multiple Access) mobile communication system, and EV-DO (Evolved High-speed Data Only) technologies on the CDMA 2000 system etc. correspond to the above high-speed data communication method. For example, 3Gpp TS 25.308 V5.3.0 etc. specifies HSDPA, and 3GPP2 S.R0023 version 2.0 etc. specifies EV-DO.

In Published Unexamined Japanese Patent Application No. 2001-217770, an outer loop transmit power control method for mobile stations during handover in a mobile communication system is disclosed. In this method, where the mobile station is communicating with the only one wireless base station, the wireless base station controls the transmit power of the mobile station based on the quality of the signal received from the mobile station. When the mobile station performs a handover, the control station combines the reception quality in the plurality of wireless base stations involved in the handover. The wireless base station controller controls the transmit power of the mobile station based on the combined reception quality.

Even where the communication including voice communication and the high-speed data communication are performed at the same time, a quality of the cellular mobile communication is improved by performing outer loop control. However, until now, favorable results have not been achieved.

SUMMARY OF THE INVENTION

It is therefore an object of the present invention to provide an improvement of wireless communication system. According to a first aspect of the present invention, a wireless communication system comprises a plurality of base stations simultaneously communicating with a mobile station by receiving a radio signal relating to a first communication type transmitted by the mobile station; a specific base station communicating with the mobile station by receiving a radio signal relating to a second communication type different from the first communication type; a controller receiving signals, based on the radio signal relating the first communication type, from the plurality of base stations, and receiving a signal based on the radio signal relating to the second communication type, from the specific base station, wherein said controller transmits a first control signal to the plurality of base stations and the specific base station, on the basis of the signal based on the radio signal relating to the second communication type received from the specific base station.

According to a second aspect of the present invention; a controller in a wireless communication system for a mobile station simultaneously communicating with a plurality of base stations comprises a receiver receiving a plurality of signals, relating to a fist communication type, from a plurality of base stations, and receiving a signal, relating to a second communication type different from the first communication type, from a specific base station; and a transmitter, coupled to the receiver, transmitting a control signal generated on the basis of the signal relating to the second communication type received by the receiver from the specific base station, to the plurality of base stations and the specific base station.

BRIEF DESCRIPTION OF THE DRAWINGS

These and other features, aspects and advantages of the present invention will become better understood with reference to the following description, appended claims and accompanying drawings, wherein:

FIG. 5 shows the operation of the wireless base station controller;

FIG. 6 shows the operation of a mobile communication system;

FIG. 7 shows the operation of the wireless base station controller;

FIG. 8 shows a signal format between a wireless base station and a wireless base station controller.

DETAILED DESCRIPTION OF THE INVENTION

An embodiment of the present invention will be described-below with reference to the drawings. However, the present invention is not limited by the following description. Also, although specific details necessary for understanding the present invention are explained in the following description and drawings. In order not to obscure the explanation of the present invention, details unnecessary for understanding the present invention have been omitted.

Figure 1:
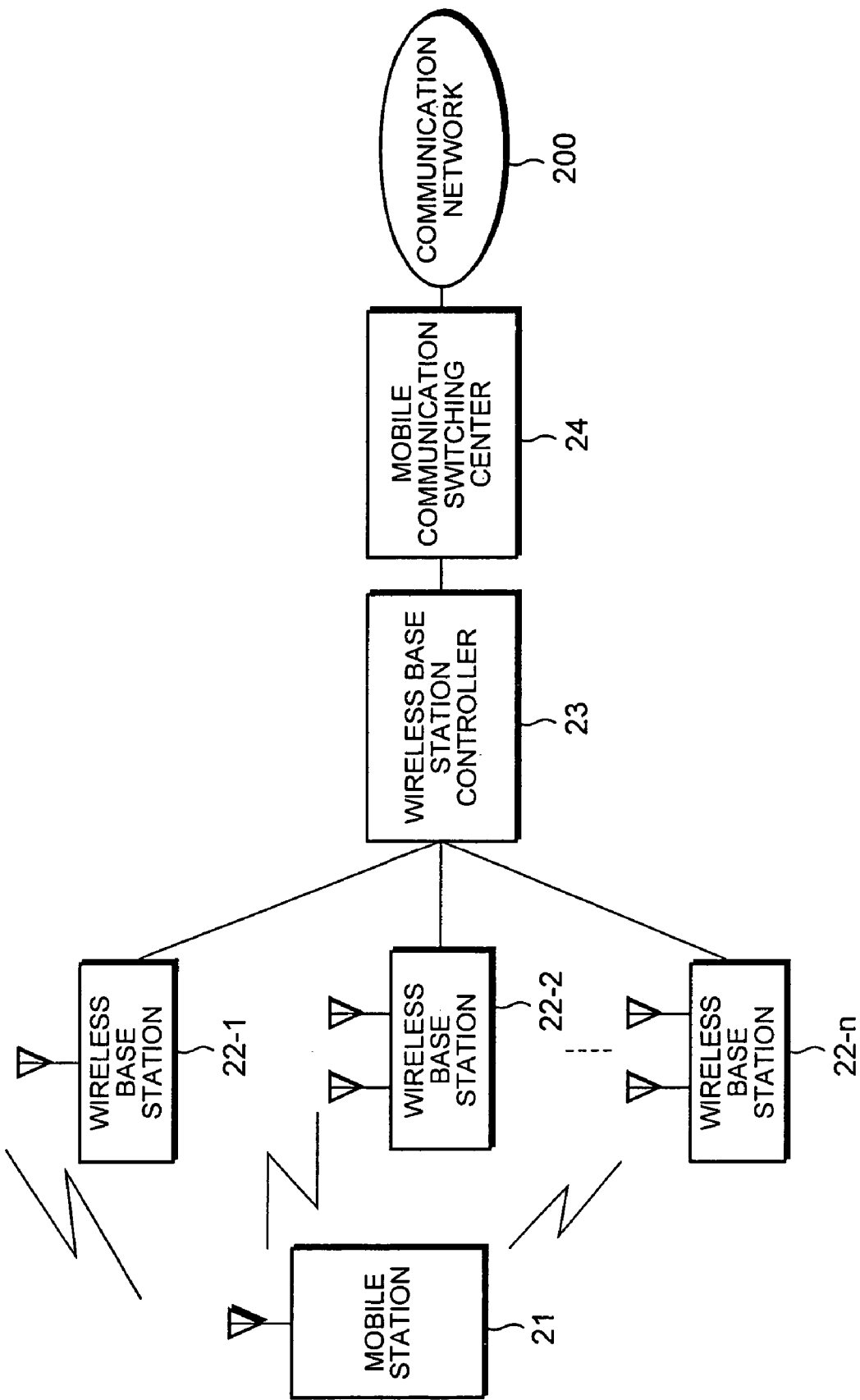
FIG. 1 shows the structure of a mobile communication system.

FIG. 1 shows the structure of the mobile communication system according to the embodiment of the present invention. The mobile communication system according to the embodiment of the present invention may be a CDMA (Code Division Multiple Access) mobile communication system, for example. The mobile communication system of the embodiment of the present invention comprises a mobile station 21, wireless base stations 22-1 to 22-n, a wireless base station controller 23, a mobile communication switching device 24, and a communication network 200.

The mobile communication system according to the embodiment of the present invention may perform a high-speed data communication specialized to data communication and a communication including voice communication at once. In the high-speed data communication specialized to data communication, several functions, e.g. soft handover, are not supported. Therefore, a mobile station performing high-speed data communication communicates with only one wireless base station at the same time. The communication including voice communication, in which a mobile station communicates with a plurality of base station at once during the handover procedure, is called a normal communication, in the following discussion, to be differentiated from the high-speed data communication.

The mobile station 21 communicates with the communication network 200 via the wireless base stations 22-1 to 22-n, wireless base station controller 23 and mobile communication switching center 24. The mobile station 21 can perform the high-speed data communication and the normal communication at the same time. The high-speed data communication may be, for example, W-CDMA HSDPA or CDMA 2000 EV-DO. The mobile station 21 transmits and receives the radio signals comprising the user signal relating to the normal communication to and from the plurality of wireless base stations 22-1 to 22-n during the handover procedure. The mobile station 21, however, transmits and receives the radio signal comprises the user signal relating to the high-speed data communication, to and from only one wireless base station among the wireless base stations 22-1 to 22-n. Also, the mobile station 21 according to the embodiment of the present invention, controls the transmit power of radio signals to the wireless base stations 22-1 to 22-n based on a transmit power control signal included in the radio signal received from the wireless base stations 22-1 to 22-n. The procedure to control the transmit power described in 3GPP TS 25.214 v5.3.0 may be applied to the embodiment of the present invention.

The wireless base stations 22-1 to 22-n receive the user signal from the mobile station 21 as a radio signal, demodulate the radio signal received from the mobile station 21, and derive quality information from the radio signal. The quality information according to the embodiment of the present invention is error information. The error information may show the error rate, CRC (cyclic redundancy code), etc. The error information here may be derived from a Viterbi decoder or Turbo decoder. The wireless base stations 22-1 to 22-n transmit the derived error information to the wireless base station controller 23 together with the user signal.

Also, the wireless base stations 22-1 to 22-n receive, from the wireless base station controller 23, the user signal and signal to interference ratio (SIR) target for the radio signal received by the wireless base stations 22-1 to 22-n from the mobile station 21. SIR target is generated as a quality target by the wireless base station controller on the basis of the error information as explained in detail later. The wireless base stations 22-1 to 22-n generate a transmit power control signal-for controlling the transmit power of the radio signal transmitted by the mobile station 21, on the basis of SIR target and calculated SIR of the radio signal received from the mobile station 21. The procedure to generate the transmit power control signal described in 3GPP TS 25.214 v5.3.0 may be applied to the embodiment of the present invention.

The transmit power control signal according to the embodiment of the present invention directs to increase or decrease the transmit power of the mobile station 21. The transmit power control, however, may direct to control the transmit power to a certain value.

The wireless base stations 22-1 to 22-n transmit the user signal and the transmit power control signal to the mobile station 21 as a radio signal.

The wireless base station controller 23 receives the user signal and quality information thereof from the wireless base stations 22-1 to 22-n, and transmits the received user signal to the communication network 200 via the mobile communication switching center 24. The quality information according to the embodiment of the present invention is the error information as explained above.

Also, during the handover procedure, the wireless base station controller 23 receives, via the wireless base stations involved in the handover among the wireless base stations 22-1 to 22-n, the user signal transmitted from the mobile station 21. In this case, the wireless base station controller 23 selectively combines the user signals received from the plurality of wireless base stations and transmits them to communication network 200 via the mobile communication switching center 24.

The wireless base station controller 23 receives the user signal from the communication network 200 via the mobile communication switching center, and transmits the received user signal to the base station among the wireless base stations 22-1 to 22-n communicating with the mobile station 21. Also, during the handover procedure, the wireless base station controller 23 transmits the received-user signal to a plurality of wireless base stations among the wireless base stations 22-1 to 22-n involved in the handover procedure.

Figure 2:
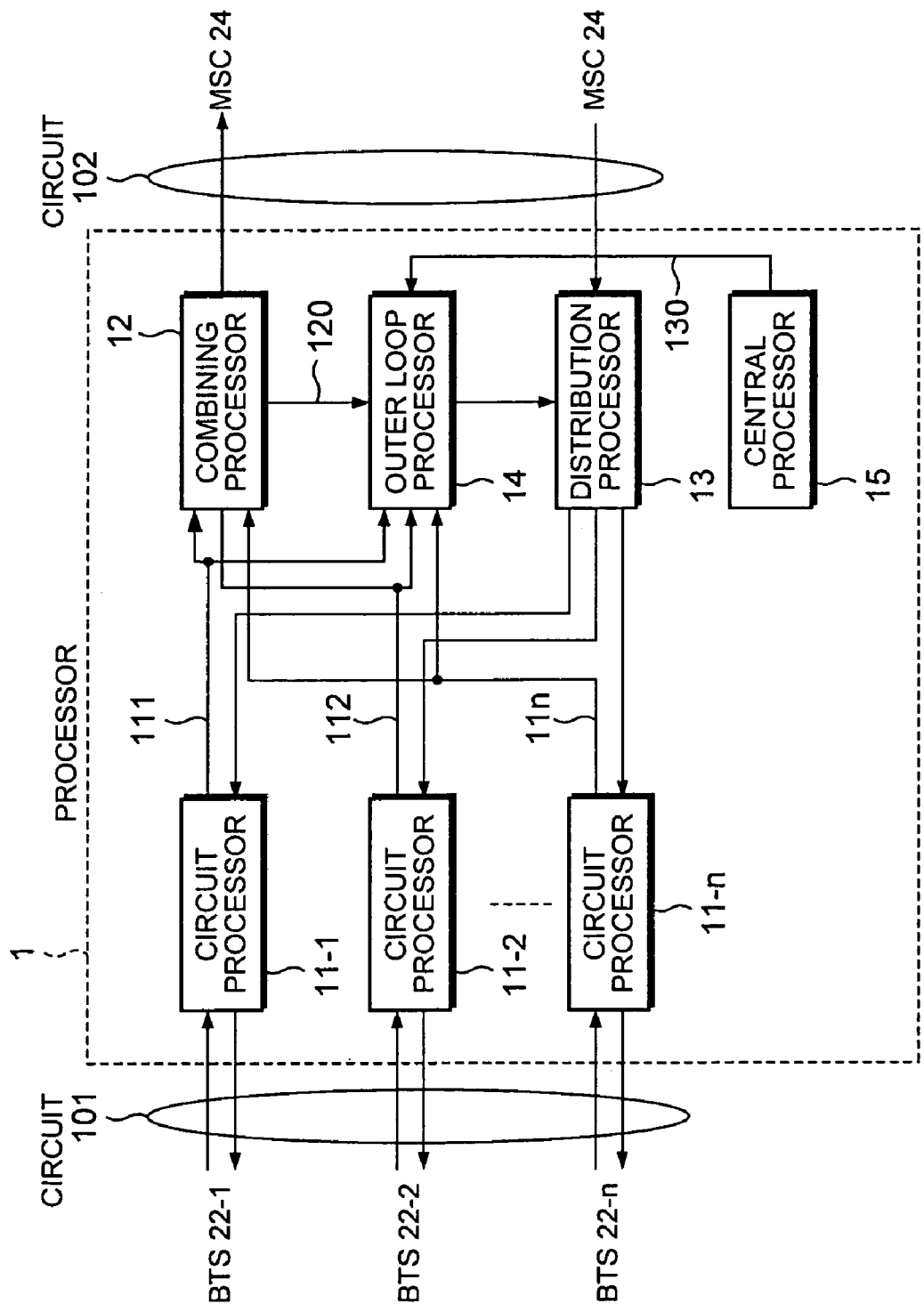
FIG. 2 shows the structure of a processor within a wireless base station controller.

The structure of the wireless base station controller will now be explained in detail. FIG. 2 is a block drawing showing the structure of a processor 1 included in the wireless base station controller 23. The processor 1 is comprised of-circuit processors 11-1 to 11-n, a combining processor 12, a distributing processor 13, an outer loop processor 14, and a central processor 15.

The circuit processors 11-1 to 11-n respectively receive signals from the wireless base stations 22-1 to 22-n via a circuit 101, and provide the signals received from each of the wireless base stations 22-1 to 22-n for the combining processor 12.

The signals communicated between the wireless base stations 22-1 to 22-n and the wireless base station controller 23, as shown in FIG. 8, comprise a user signal A1 and a control signal A2. The control signal A2 is a control signal used between the wireless base stations 22-1 to 22-n and the wireless base station controller 23. The control signal A2 comprises the error information as quality information of the user signal A1 received and demodulated by the wireless base station 22-1 to 22-n.

The circuit processors 11-1 to 11-n process the control signal A2 included in each of the signals received from the wireless base stations 22-1 to 22-n, and provide the processed control signals A2 for the outer loop processor 14 as signals 111 to 11n. Also, the circuit processors 11-1 to 11-n receive, from the distributing processor 13, the user signals bound for the mobile station 21 and SIR target for the radio signal received by the wireless base stations 22-1 to 22-n. The circuit processors 11-1 to 11-n transmit, to each of the wireless base stations 22-1 to 22-n, the user signals bound for the mobile station 21 and the SIR targets as control signals.

The combining processor 12 transmits the user signals received from the circuit processors 11-1 to 11-n to the mobile communication switching center 24 via the circuit 102. During the handover procedure, the combining processor 12 selects and combines user signals that satisfy the quality requirement on the basis of the error information included in the control signals A2 of the signals received from the circuit processors 11-1 to 11-n. Satisfying the quality requirement may indicate that the error rate is less than a specific value, there is no error in terms of CRC, etc. The combining processor 12, for example, selects one user signal, which satisfy the quality requirement based on the error information, for each frame from among the user signals received from the plurality of wireless base stations, and transmits the selected user signal to the communication network 200 via the mobile communication switching center 24.

In this case, the combining processor 12 transmits the combined user signal to the mobile communication switching center 24 via the circuit 102, and, where the error information relating to all of the user signals received from the circuit processors 11-1 to 11-n does not satisfy the quality requirement, transmits the combined error information to the outer loop processor 14 as a signal 120.

The central processor 15 generally controls the mobile communication system. The central processor 15 controls whether the high-speed data communication is performed or not, and through which base station the high-speed data communication is performed. Also, the central processor provide a setting signal 130 to the outer loop controller 14 as explained in more detail later.

Figure 3:
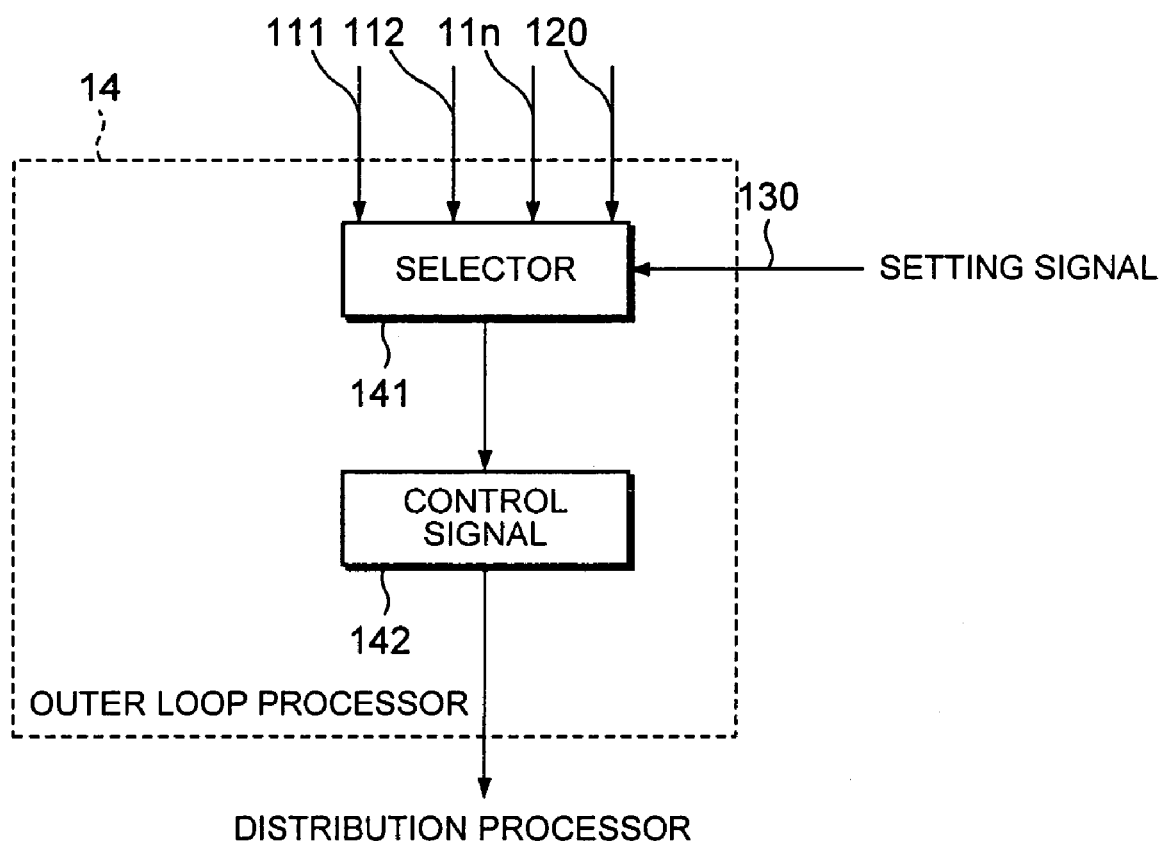
FIG. 3 shows the structure of an outer loop processor.

FIG. 3 is a block diagram showing the structure of an outer loop processor 14. The outer loop processor 14 is comprised of a selector 141 and a control signal generator 142. In the outer loop processor 14, the signals 111 to 11n from the circuit processors 11-1 to 11-n and the control signal 120 from the combining processor 12 are input to the selector 141.

The selector 141 selects one from among the signals 111 to 11n and the signal 120 based on a setting signal 130 from a central processor 15, and provides the selected one for the control signal generator 142. The setting signal 130 from the central processor 15 will be explained in more detail later.

The control signal generator 142 generates SIR target as the quality target for the radio signal received by the wireless base stations 22-1 to 22-n on the basis of the control 111 to 11n and the signal 120 input from the selector 141, and then outputs the generated SIR target to the distributing processor 13.

Referring to FIG. 2 again, the distributing processor 13 receives, from the mobile communication switching center 24 via the circuit 102, the user signal bound for the mobile station 21, and distributes the received user signal to the circuit processors 11-1 to 11-n. Also, the distributing processor 13 distributes SIR target received from the outer loop processor 14 to the circuit processors 11-1 to 11-n.

Figure 4:
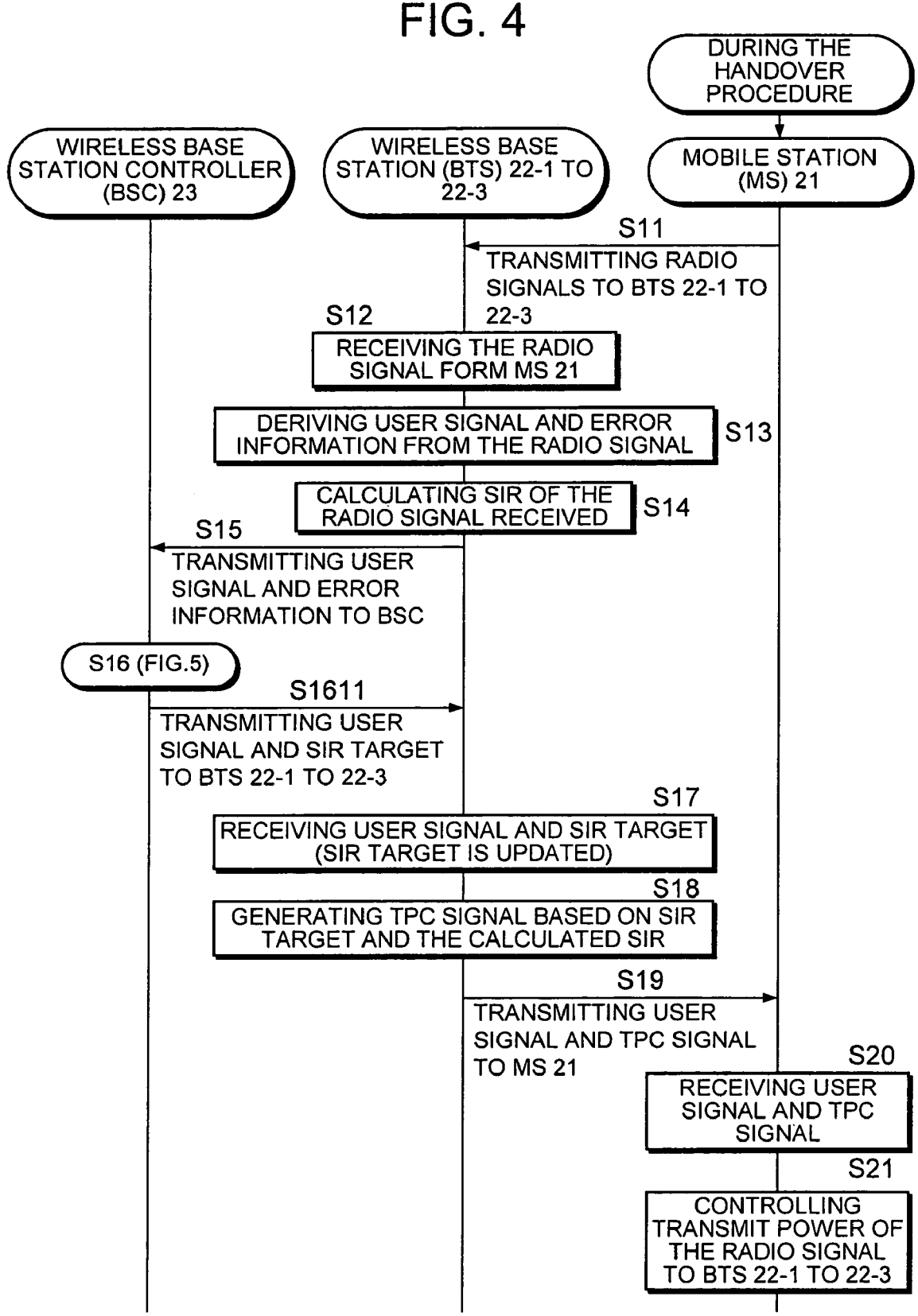
FIG. 4 shows the operation of a mobile communication system.

FIG. 4 shows the operation procedure of the mobile communication system according to the embodiment of the present invention. Referring to FIGS. 1 to 5 and 8, the operation of a CDMA mobile communication system according to the embodiment of the present invention will be explained. The mobile station 21 communicates with the network 200 via the wireless base stations 22-1 to 22-n, wireless base station controller 23, and the mobile communication switching center 24. Also, the mobile station 21 performs a handover via the wireless base stations 22-1, 22-2 and 22-3.

The mobile station 21 transmits a radio signal to the wireless base station 22-1 to 22-3 (S11). The wireless base stations 22-1 to 22-3 each receive a user signal from the mobile station 21 as a radio signal (S12), and demodulate the radio signals received from the mobile station 21 to derive the user signal and the error information of the user signals from the radio signal received (S13). Also, the wireless base stations 22-1 to 22-3 calculate SIR of the radio signal received from the mobile station 21 in order to generate a transmit power control signal for an uplink transmit power control(S14). The wireless base stations 22-1 to 22-3 then transmit the received user signals A1 and a control signals A2 including the error information to the wireless base station controller 23 (S15).

FIG. 5 shows the operation of the wireless base station controller (S16) in detail. The circuit processors 11-1 to 11-3 in the wireless base station controller 23 receive the signals from each of the wireless base stations 22-1 to 22-3 (S161). Also, the circuit processor 11-1 to 11-3 provide, the received signals for the combining processor 12, and provide the control signals A2 included in the received signals as signals 111 to 113 for the outer loop processor 14 (S162).

The combining processor 12 selects and combines the user signals that satisfy the quality requirement based on the error information included in the control signal A2 of the signal received from the circuit processors 11-1 to 11-3 (S163). In this case, the combining processor 12 transmits the combined user signals to the mobile communication switching center 24 via the circuit 102 (S164). Also, the combining processor 12, where all of the error information received from the circuit processors 11-1 to 11-3 does not satisfy the quality requirement, combines the error information and provides the combined error information as the signal 120 for the outer loop processor 14 (S165).

The selector 141 of the outer loop processor 14 receives the signals 111 to 113 from the circuit processors 11-1 to 11-3, and also receives the signal 120 from the combining processor 12. The selector 141 selects one from among the control signals 111 to 113 and the control signal 120 based on a setting signal 130 from the central processor 15 within the wireless base station controller 23, and provides it for the control signal generator 142.

Where the mobile station 21 does not perform the high-speed data communication, the central processor 15 provides, for the selector 141 in the outer loop processor 14, the setting signal 130 indicating that the selector 141 selects the control signal 120 and provides it for the control signal generator 142 (S166). This control will hereafter be referred to as control procedure 1. In this case, the control signal generator 142, when the control signal 120 has been provided from the selector 141, generates SIR target, and provide the generated SIR target for the distributing processor 13 (S168). The distributing processor 13 distributes SIR target received from the control signal generator 142, together with the user signal received from the mobile communication switching center 24 via the circuit 102, to the circuit processors 11-1 to 11-3 (S1610). The circuit processors 11-1 to 11-3 respectively transmit the received user signal and SIR target to the wireless base stations 22-1 to 22-3 (S1611).

Referring to FIG. 4 again, the wireless base stations 22-1 to 22-3 receives the user signal and SIR target from the wireless base station controller 23, then SIR targets of the wireless base stations 22-1 to 22-3 are updated (S17). The wireless base stations 22-1 to 22-3 generate the transmit power control signal for controlling the transmit power of the radio signal transmitted by the mobile station 21 based on the updated SIR target and the calculated SIR in the step S14 (S18). Also, the wireless base stations 22-1 to 22-3 transmit the user signal and the transmit power control signals generated to the mobile station 21 (S19).

The mobile station 21 receives the user signals and the transmit power control signals from the wireless base stations 22-1 to 22-3 (S20). Also, the mobile station 21 controls the transmit power of the radio signal to the wireless base stations 22-1 to 22-3 on the basis of the transmit power control signals received (S21).

In this way, where the mobile station 21 does not perform the high-speed data communication, SIR targets are updated only when the error rate information relating to all of the user signals received by the wireless base stations 22-1 to 22-3 does not satisfy the quality requirement. However, as described below, where the mobile station 21 performs the normal communication and the high-speed data communication at the same time, the SIR targets must be updated by a different procedure.

As described above, the mobile station 21 transmits and receives radio signals relating to the high-speed data communication to and from only one wireless base station among the wireless base stations 22-1 to 22-n. Here, the mobile station 21 performs transmission and reception of signals relating to the high-speed data communication with the wireless base station 22-2, i.e. it transmits and receives user signals relating to the high-speed data communication only with respect to the wireless base station 22-2. Consequently, if the control procedure 1 is executed, while the high-speed data communication is performed together with the normal communication, the quality information of a user signal relating to the high-speed data communication received by the wireless base station 22-2 would continuously be unsatisfied with the quality requirement, and then the high-speed data communication would be degraded. For example, in a case where the error information on the user signal relating to the normal communication received by the wireless base station 22-1 satisfies the quality requirement, the SIR targets in the wireless base stations 22-1 to 22-3 are not updated even though the error information on the signal relating to the high-speed data communication received by the wireless base station 22-2 does not satisfy the quality requirement. Consequently, the error information of a user signal relating to the high-speed data communication received by the wireless base station 22-2 would continuously be unsatisfied with the quality requirement, and then the high-speed data communication would be degraded.

Thus, where the mobile station 21 is performing the high-speed data communication, control procedure 2 described bellow is executed. In the control procedure 2, the steps from S11 to S165 are the same as those in the control procedure 1. Referring to FIG. 5 again, during the control procedure 2, the central processor 15 detects the high-speed data communication being performed with the base station 22-2. The central processor provides, for the selector 141, the setting signal 130 directing to select a signal 112, which is relevant to the user signal relating to the high-speed communication, from among the signals 111 to 113 (S167). Here, because the central processor 15 controls whether the high-speed data communication is performed between the mobile station 21 and any one of the wireless base stations, the central processor 15 can detect which one among the signal 111 to 113 is relevant to the user signal relating to the high-speed data communication. The selector 114 provides the signal 112 for the control signal generator 142 on the basis of the setting signal 130 from the central processor. The control signal generator 142 generates, based on the input signal 112, a SIR target for the radio signal, transmitted by the mobile station 21, received by the wireless base station 22-1 to 22-3. Then, the control signal generator 142 provides the generated SIR target for the distributing processor 13 (S169). The distributing processor 13 distributes SIR target received from the control signal generator 142, together with the user signal received from the mobile communication switching center 24 via the circuit 102, to the circuit processors 11-1 to 11-3 (S1610). The circuit processors 11-1 to 11-3 respectively transmit the received user signal and SIR target to the wireless base stations 22-1 to 22-3 (S1611).

Referring to FIG. 4 again, the wireless base stations 22-1 to 22-3 receives the user signal and SIR target from the wireless base station controller 23, then SIR targets of the wireless base stations 22-1 to 22-3 are updated (S17). The wireless base stations 22-1 to 22-3 generate the transmit power control signal for controlling the transmit power of the radio signal transmitted by the mobile station 21 based on the updated SIR target and the calculated SIR in S14 (S18). Also, the wireless base stations 22-1 to 22-3 transmit the user signal and the transmit power control signals generated to the mobile station 21 (S19).

The mobile station 21 receives the user signals and the transmit power control signals from the wireless base stations 22-1 to 22-3 (S20). Also, the mobile station 21 controls the transmit power of the radio signal to the wireless base stations 22-1 to 22-3 on the basis of the transmit power control signals received (S21).

By executing the above control procedure 2, in cases where the mobile station 21 performs the high-speed data communication, the error information of a user signal relating to the high-speed data communication is no longer continuously unsatisfied with the quality requirement. Then, the quality of the high-speed data communication is improved. As described above, a case where the mobile station 21 performs transmission and reception of signals relating to the high-speed data communication with the wireless base station 22-2 is considered. In this case, even when, for example, the error information relevant to a user signal relating to the normal communication received by the wireless base station 22-1 satisfies the quality requirement, if the error rate information relevant to a signal relating to the high-speed data communication received by the wireless base station 22-2 does not satisfy the quality requirement, the SIR targets in the wireless base stations 22-1 to 22-3 are updated. Based on the updated SIR targets, the wireless base stations 22-1 to 22-3 control the transmit power of the mobile station 21. Consequently, there is no continuation of the state where the error information of the user signals relating to the high-speed data communication received by the wireless base station 22-2 does not satisfy the quality requirement.

The procedure to control the transmit power of the radio signal transmitted by the mobile station 21 is explained in detail bellow. The wireless base stations 22-1 to 22-3, where SIR calculated based on a signal received from the mobile station 21 falls below SIR target, transmit a signal requesting an increase in transmit power or a signal indicating a specific transmit power to the mobile station 21. Also, the wireless base stations 22-1 to 22-3, where the SRI calculated based on a signal received from the mobile station 21 rises above SIR target, transmit a signal requesting a decrease in transmit power or a signal indicating a specific transmit power to the mobile station 21.

The mobile station 21 controls transmit power based on the transmit power control signals received from the wireless base stations 22-1 to 22-3. At this time, the mobile station 21, according to a specific rule, controls the transmit power based on the plurality of transmit power control signals received from the wireless base stations 22-1 to 22-3. The specific rule may be, for example, the following. Where all of the received transmit power control signals indicate an increase in transmit power, the mobile station 21 increases the transmit power by a specific percentage. Where any one of the received transmit power control signals indicates a decrease in transmit power, the mobile station 21 decreases the transmit power by a specific percentage. Also, the mobile station 21 may regard a plurality of transmit power control signals received during a handover procedure as the same. In that case, the mobile station 21 combines the received plurality of transmit power control signals into one. The mobile station 21, when the combined transmit power control signal indicates an increase in transmit power, increases the transmit power by a specific percentage, and when the combined transmit power control signal indicates a decrease in transmit power, decreases the transmit power by a specific percentage. Also, the mobile station 21 may give the transmit power control signal from the wireless base station performing the high-speed data communication a priority. In this case, for example, the mobile station 21 controls the transmit power on the basis of the transmit power control signal from the wireless base station performing the high-speed data communication.

The procedure to control the transmit power described in 3GPP TS 25.214 v5.3.0 may also be applied to the embodiment of the present invention.

In this embodiment, when the high-speed data communication is performed, the SIR target is generated based on the only one signal among the signals 111 to 11n from the circuit processors 11-1 to 11-n since only one wireless base station performs the high-speed data communication. The number of the signals among the 111 to 11n, based on which the SIR target is generated, is not limited to the only one. When a plurality of wireless base stations, the number of which is less than the number of the wireless base stations involved in the handover on the normal communication, perform the high-speed data communication, the SIR target may be generated based on the plurality of signals among 111 to 11n relating to the high-speed data communication.

Referring to FIGS. 6 and 7, other embodiments of the present invention will be explained. The same operations as those in the previous embodiment are referred to as the same number.

In the mobile communication system according to the previous embodiment of the present invention, the outer loop processor 14 in the wireless base station controller 23 generates and provides for the distributing processor 13, SIR target for the radio signal received by the wireless base stations 22-1 to 22-3 in order to control the transmit power of the mobile station 21. Referring to FIG. 7, in this embodiment, the outer loop processor 14 in the wireless base station controller 23, however, may generate and provides, for the distributing processor 13, other control signal 40 than the SIR target (S301, S302). The control signal 40 may be other quality target (e.g. error rate target, Eb/N0 target (where Eb is the energy, or power density, per user bit and N0 is the interference and noise power density), etc.), directing to change modulation type (e.g. BPSK, QPSK, 16QAM, etc.), transmit power, communication type (e.g. the high-speed data communication to the normal communication), and bit rate (spreading factor) of the radio signal or the user signal transmitted by the mobile station 21, etc.

The distributing processor 13 distributes, to the circuit processors 11-1 to 11-3, the control signal 40 received from the outer loop processor 14, together with the user signal received from the mobile communication switching center 24 via the circuit 102 (S303). The circuit processors 11-1 to 11-3 respectively transmit the received user signal and the control signal 40 to the wireless base stations 22-1 to 22-3 (S304).

Referring to FIG. 6, the wireless base stations 22-1 to 22-3 receive the user signal and the control signal 40 from the wireless base station controller 23 (S31). In the mobile communication system according to the previous embodiment of the present invention, the wireless base stations 22-1 to 22-3 generate the transmit power control signal for controlling the transmit power of the radio signal transmitted by the mobile station 21. In this embodiment, the wireless base station 22-1 to 22-3, however, may generate other control signal 50 than the transmit power control signal based on the control signal 40 received from the wireless base station controller 23 (S32). The control signal 50 may be directing to change modulation type (e.g. BPSK, QPSK, 16QAM, etc.), transmit power, bit rate (spreading factor), and communication type (e.g. the high speed data communication to the normal communication), of the radio signal or the user signal transmitted by the mobile station 21, etc. Also, the wireless base stations 22-1 to 22-3 transmit the user signal and the control signals 50 generated to the mobile station 21 (S33).

The mobile station 21 receives the user signals and the control signals 50 from the wireless base stations 22-1 to 22-3 (S34). In the mobile communication system according to the previous embodiment of the present invention, the mobile station 21 controls the transmit power of the radio signal to the wireless base stations 22-1 to 22-3 on the basis of the transmit power control signals received. In this embodiment, the mobile station 21, however, may control the radio signal in other ways than controlling the transmit power of the radio signal (S35). The mobile station 21 may change modulation type (e.g. BPSK, QPSK, 16QAM, etc.), transmit power, bit rate (spreading factor), and communication type (e.g. the high speed data communication to the normal communication), of the radio signal or the user signal transmitted, etc.

In this embodiment, when the high-speed data communication is performed, the control signal 40 is generated based on the only one signal among the signals 111 to 11n from the circuit processors 11-1 to 11-n since only one wireless base station performs the high-speed data communication. The number of the signals among the 111 to 11n, based on which the control signal 40 is generated, is not limited to the only one. When a plurality of wireless base stations, the number of which is less than the number of the wireless base stations involved in the handover on the normal communication, perform the high-speed data communication, the control signal 40 may be generated based on the plurality of signals among 111 to 11n relating to the high-speed data communication.

In the embodiments of the present invention described above, the setting signal 130 is input from a central processor 15 inside the wireless base station controller 23 to the outer loop processor 14. The setting signal 130, however, may also be input from outside the wireless base station controller 23.

In the embodiments described above, the user signal relating to the normal communication may be Dedicated physical control channel (DPCCH) in the WCDMA. Also, the uplink user signal relating to the high-speed data communication may be High-speed dedicated physical control channel (HS-DPCCH), and the downlink user signal may be DPCCH and High-speed shared control channel (HS-SCCH) in the WCDMA.

A characteristic aspect of the present invention is that, when the mobile station transmits radio signals to a plurality of base stations, those base stations are controlled based on the radio signal received by a specific base station of them, regardless of whether the high-speed data communication is performed or not. According to one embodiment of the present invention, a control signal for controlling the base stations is determined based on quality information on the radio signal received by a specific base station.

Also a characteristic aspect of the present invention is that, when the mobile station transmits radio signals to a plurality of base stations, those base stations are controlled in different way depending on whether high-speed communication is performed or not. According to one embodiment of the present invention, the base stations are controlled based on the radio signal related to the high-speed data communication.

According to the present invention, cellular mobile communication system can be improved. Also, maintenance of the enough power required for signals relating to the high-speed data communication transmitted by a mobile station is possible and the transfer efficiency of the high-speed data communication can be improved. Further, setting the power relating to the high-speed data communication transmitted by a mobile station higher than that for the normal communication is unnecessary. Consequently, the amount of signal interference can be suppressed, and communication capacity can be improved.

It will be obvious to those having skill in the art that many changes may be made in the above-described details of the preferred embodiments of the present invention. The scope of the present invention should be determined by the following claims.

What is claimed is:

1. A wireless communication system comprising:
   a plurality of base stations simultaneously communicating with a mobile station by receiving a radio signal relating to a first communication type transmitted by the mobile station;
   a specific base station communicating with the mobile station by receiving a radio signal relating to a second communication type different from the first communication type; and
   a controller receiving signals, based on the radio signal relating the first communication type, from said plurality of base stations, and receiving a signal, based on the radio signal relating to the second communication type, from said specific base station,
   wherein said controller transmits a first control signal to said plurality of base stations and said specific base station, on the basis of the signal based on the radio signal relating to the second communication type received from the specific base station, and said plurality of base stations and said specific base station control the radio signal transmission of the mobile station based on the first control signal.

2. A wireless communication system according to claim 1, wherein the first communication type is applied to a voice communication, the second communication type is specialized to a packet access communication.

3. A wireless communication system according to claim 1, wherein the signal received by said controller from said specific base station comprises a quality information on the radio signal relating to the second communication type received by the specific base station from the mobile station, said controller generates the first control signal on the basis of the quality information.

4. A wireless communication system according to claim 1, wherein said controller generates a quality target, as the first control signal, for the radio signal received by said plurality of base station and said specific base station communicating with the mobile station.

5. A wireless communication system according to claim 1, wherein said plurality of base stations and said specific base station receive the first control signal transmitted by said controller, and transmits a second control signal to the mobile station, on the basis of the first control signal.

6. A wireless communication system according to claim 5, wherein the signal received by said controller from said specific base station comprises a quality information on the radio signal relating to the second communication type received by the specific base station from the mobile station,
   the first control signal is a quality target for the radio signal received by said plurality of base stations and the radio signal received by the specific base station from the mobile station,
   the second control signal is a transmit power control signal for controlling a transmit power of the radio signal transmitted by the mobile station.

7. A wireless communication system according to claim 6, wherein the transmit power control signal directs to increase or decrease the transmit power of the radio signal transmitted by the mobile station.

8. A wireless communication system comprising:
   a mobile station transmitting a radio signal relating to a first communication type and a radio signal relating to a second communication type different from the first communication type;
   a plurality of base stations communicating with said mobile station by receiving the radio signal relating to the first communication type;
   a specific base station communicating with said mobile station by receiving the radio signal relating to the second communication type; and
   a controller receiving signals, based on the radio signal relating the first communication type, from said plurality of base stations, and receiving a signal based on the radio signal relating to the second communication type, from said specific base station,
   wherein said controller transmits a first control signal to said plurality of base stations and said specific base station, on the basis of the signal based on the radio signal relating to the second communication type received from the specific base station, and said plurality of base stations and said specific base station control the radio signal transmission of the mobile station based on the first control signal.

9. A controller in a wireless communication system for a mobile station simultaneously communicating with a plurality of base stations comprising:
   a receiver receiving a plurality of signals, relating to a fist communication type, from a plurality of base stations, and receiving a signal, relating to a second communication type different from the first communication type, from a specific base station; and
   a transmitter transmitting, coupled to said receiver, a control signal generated on the basis of the signal relating to the second communication type received by said receiver from the specific base station, to the plurality of base stations and the specific base station, wherein said plurality of base stations and said specific base station control the radio signal transmission of the mobile station based on the first control signal.

10. A controller in a wireless communication system for a mobile station communicating with a plurality of base stations according to claim 9, wherein the first communication type is applied to a voice communication, the second communication type is specialized to a packet access communication.

11. A controller in a wireless communication system for a mobile station communicating with a plurality of base stations according to claim 9, wherein the signal received by said receiver from said specific base station comprises a quality information on a radio signal relating to the second communication type received by the specific base station from the mobile station.

12. A controller in a wireless communication system for a mobile station communicating with a plurality of base stations according to claim 11, wherein the first control signal is a quality target for a radio signal received by said plurality of base stations and the radio signal received by the specific base station from the mobile station.

13. A controller in a wireless communication system for a mobile station simultaneously communicating with a plurality of base stations comprising:
 a receiving means for receiving a plurality of signals, relating to a fist communication type, from a plurality of base stations, and receiving a signal, relating to a second communication type different from the first communication type, from a specific base station; and
 a transmitting means for transmitting a control signal generated on the basis of the signal relating to the second communication type received by said receiving means from the specific base station, to the plurality of base stations and the specific base station,
 wherein said plurality of base stations and said specific base station control the radio signal transmission of the mobile station based on the first control signal.

14. A controller in a wireless communication system for a mobile station communicating with a plurality of base stations according to claim 13, wherein the first communication type is applied to a voice communication, the second communication type is specialized to a packet access communication.

15. A controller in a wireless communication system for a mobile station communicating with a plurality of base stations according to claim 13, wherein the signal received by said receiving means from said specific base station comprises a quality information on a radio signal relating to the second communication type received by the specific base station from the mobile station.

16. A controller in a wireless communication system for a mobile station communicating with a plurality of base stations according to claim 15, wherein the first control signal is a quality target for a radio signal received by said plurality of base stations and the radio signal received by the specific base station from the mobile station.

17. A controlling method for a wireless communication system comprising:
 communicating simultaneously between a plurality of base station and a mobile station by using a radio signal relating to a first communication type;
 communicating between a specific base station and the mobile station by using a radio signal relating to a second communication type different from the first communication type;
 receiving a signal, based on the radio signal relating to the first communication type, from the plurality of base stations;
 receiving a signal, based on the radio signal relating to the second communication type, from the specific base station; and
 transmitting a first control signal to said plurality of base stations and the specific base station, on the basis of the received signal based on the radio signal relating to the second communication type, and said plurality of base stations and said specific base station control the radio signal transmission of the mobile station based on the first control signal.

18. A controlling method for a wireless communication system according to claim 17:
 receiving the first control signal; and
 transmitting a second control signal to the mobile station, on the basis of the first control signal.

19. A controlling method for a wireless communication system according to claim 18, wherein
 the received signal, based on the radio signal relating to the second communication type, comprises a quality information on the radio signal relating to the second communication type,
 the first control signal is a quality target for the radio signal relating to the first communication type and the radio relating to the second communication type,
 the second control signal is a transmit power control signal for controlling a transmit power of the mobile station.

20. A wireless communication system for a mobile station according to claim 19, wherein the transmit power control signal directs to increase or decrease the transmit power of the mobile station.

* * * * *